United States Patent
Marin (10) Patent No.: US 10,071,321 B2
(45) Date of Patent: Sep. 11, 2018

(54) METHOD FOR CONTROLLING SUBSTANCES BY MENISCUS EVAPORATION

(71) Applicant: WOW TECHNOLOGY S.P.A., Padua (IT)

(72) Inventor: Adriano Marin, Baone (IT)

(73) Assignee: WOW TECHNOLOGY S.P.A., Padua (IT)

( * ) Notice: Subject to any disclaimer, the term of this patent is extended or adjusted under 35 U.S.C. 154(b) by 727 days.

(21) Appl. No.: 14/407,116

(22) PCT Filed: Jun. 12, 2013

(86) PCT No.: PCT/IB2013/054803
§ 371 (c)(1),
(2) Date: Dec. 11, 2014

(87) PCT Pub. No.: WO2013/186714
PCT Pub. Date: Dec. 19, 2013

(65) Prior Publication Data
US 2015/0157956 A1 Jun. 11, 2015

(30) Foreign Application Priority Data
Jun. 13, 2012 (IT) .............................. CO2012A0032

(51) Int. Cl.
*B01D 5/00* (2006.01)
*B01D 3/02* (2006.01)
(Continued)

(52) U.S. Cl.
CPC ............. *B01D 5/0066* (2013.01); *B01D 3/02* (2013.01); *B01J 14/00* (2013.01); *B01J 19/006* (2013.01);
(Continued)

(58) Field of Classification Search
CPC ........ B01D 3/02; B01D 5/006; B01D 5/0066; B01J 14/00; B01J 19/006; B01J 19/18;
(Continued)

(56) References Cited

U.S. PATENT DOCUMENTS

| 3,507,753 A | 4/1970 | Jacuzzi |
| 4,936,953 A | 6/1990 | Abbott et al. |

FOREIGN PATENT DOCUMENTS

GB 595142 A 11/1947

OTHER PUBLICATIONS

Ojha, M. et al. (2008). Contact Angle, Wettability and Adhesion, 5,3-23.*
(Continued)

*Primary Examiner* — Brian A McCaig
(74) *Attorney, Agent, or Firm* — LeClairRyan PLLC (57) ABSTRACT

The method serves to control substances present in a liquid; a liquid mass is brought to temperature and pressure conditions such as to give rise to an appreciable evaporation of the liquid mass; at least one solid surface is arranged, in part inside the liquid mass and in part outside the liquid mass so as to establish at least a meniscus of the liquid on this solid surface; the shape and/or the size and/or the extension and/or the position and/or the temperature of this meniscus is controlled so that the evaporation of the liquid through said meniscus is controlled; any deposition of these substances is also controlled.

6 Claims, 4 Drawing Sheets

(51) Int. Cl.
*B01J 14/00* (2006.01)
*B01J 19/00* (2006.01)
*B01J 19/18* (2006.01)
*B01J 19/24* (2006.01)

(52) U.S. Cl.
CPC ............... *B01J 19/18* (2013.01); *B01J 19/24* (2013.01); *B01J 2219/0077* (2013.01); *B01J 2219/00135* (2013.01); *B01J 2219/00768* (2013.01); *B01J 2219/194* (2013.01); *B01J 2219/1946* (2013.01)

(58) Field of Classification Search
CPC .................... B01J 19/24; B01J 2219/00; B01J 2219/00049; B01J 2219/00051; B01J 2219/00128; B01J 2219/00121
See application file for complete search history.

(56) References Cited

OTHER PUBLICATIONS

Israelachvili, J. (2011). Intermolecular and Surface Forces, Academic Press, 704 pgs [Office action cites p. 107].*
International Search Report and Written Opinion for PCT/IB2013/054803, dated Dec. 3, 2013.

* cited by examiner

METHOD FOR CONTROLLING SUBSTANCES BY MENISCUS EVAPORATION

This application is a national stage application under 35 U.S.C. § 371 of PCT Patent Application Serial No. PCT/IB2013/054803, filed Jun. 12, 2013, which claims the priority benefit of Italy Patent Application No. CO2012A000032, filed Jun. 13, 2012.

FIELD OF THE INVENTION

The present invention relates to methods for controlling substances present in a liquid and their applications.

In particular, the present invention relates to an equipment for separating at least one substance present in a liquid, which is an application of these methods.

BACKGROUND OF THE INVENTION

"Control of the substances" as used herein means activities aimed at reducing or maintaining constant or increasing these substances according to the well-known and broad meaning that is given to the word "control" in the "engineering" field; therefore "control of the substances" as used herein, means neither the simple verification of which substances are present nor simply the simple measurement of the amount of substances present:

The control of the substances present in a liquid, for example (but not only) water, has many practical applications.

There are several known methods for performing this operation; there are known methods of the physical type and known methods of the chemical type; there are known methods that operate on large families of substances and known methods that operate on just one or two substances.

SUMMARY OF THE INVENTION

The inventor aimed at providing control methods of broad application both as regards the liquid and as regards the substances.

The inventor focused on solid substances in particular, i.e., which are present in the liquid in the form of very small, small or medium sized solid particles; large and heavy solid particles tend to naturally precipitate. However, the methods according to the present invention are also useful in other situations.

The inventor decided to perform the control of the substances by controlling the evaporation phenomenon of the liquid, but taking into account the entrainment phenomenon (entrainment by the flow of steam originating from the surface of the liquid) and of the phenomena occurring where there is a meniscus, including the deposition of material onto the solid surface adjacent to the meniscus; it is worth bearing in mind that the evaporation phenomenon also takes place at temperatures below the boiling temperature.

The main method of controlling substances present in a liquid according to the present invention is in general defined by the appended claims, which are an integral part of the present description.

The two most important applications of this method, the separation of substances and the reaction of substances, are defined in two appended claims that are an integral part of the present description.

Figure 1:
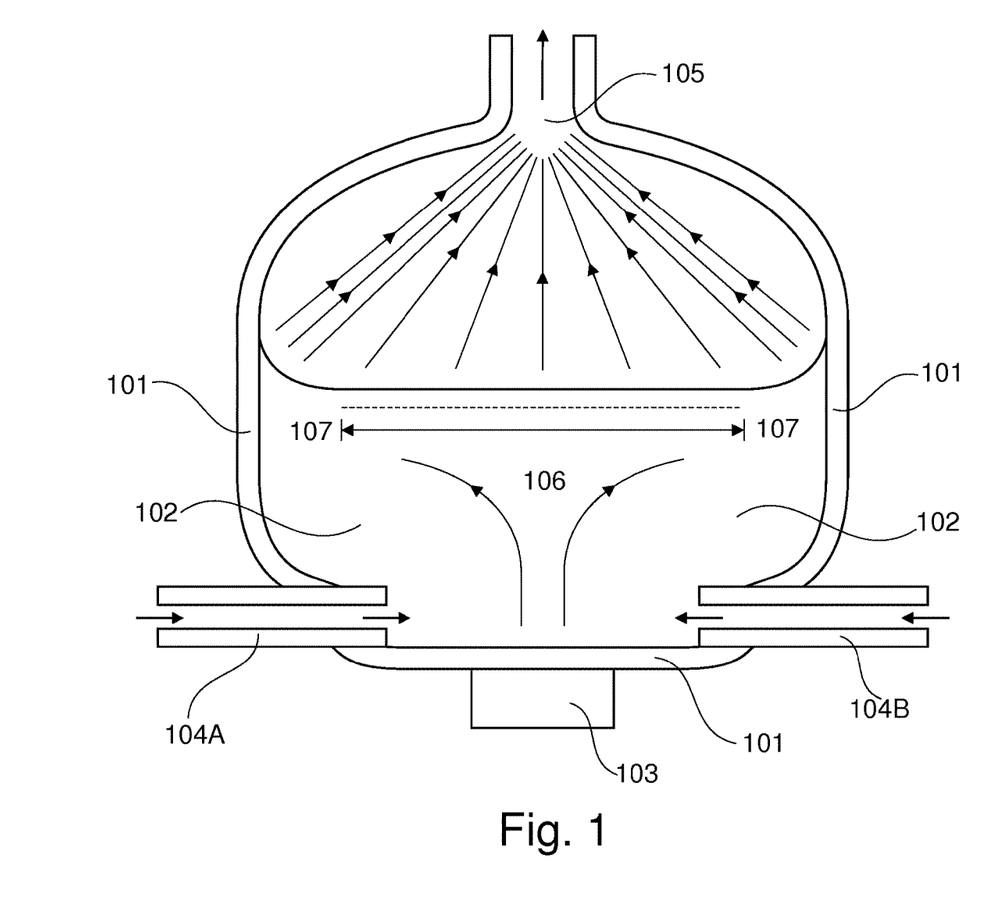
FIG. 1 shows an equipment that can be used to carry out methods for controlling substances present in a liquid according to the present invention.
Figure 7:
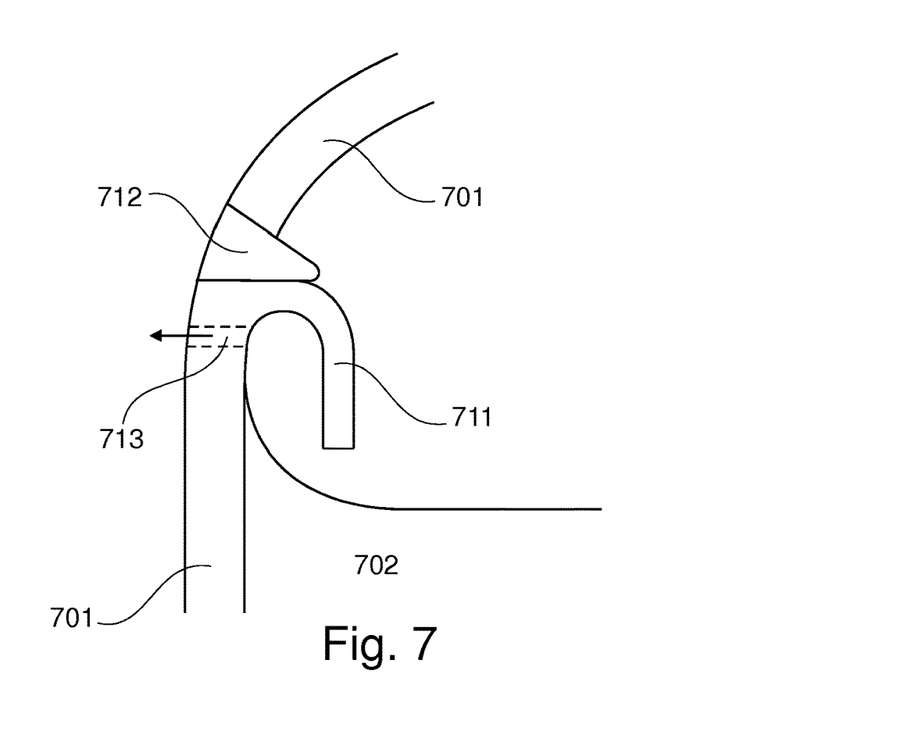
FIG. 7 shows a meniscus adjacent to a wall of a container that has a "skirt" to collect the steam.

This main method can be implemented in different ways through a multitude of equipments; the present patent application describes some of such equipments, but claims only one specific and advantageous equipment; understanding of this specific and advantageous equipment is facilitated by reference to FIG. 1 and FIG. 7.

BRIEF DESCRIPTION OF THE DRAWINGS

The technical features of the present invention and its advantages shall become apparent from the below detailed description to be considered alongside the appended drawings, wherein.

DETAILED DESCRIPTION OF THE INVENTION

Both said description and said drawings are to be considered for illustrative purposes only and are not therefore exhaustive; the present invention can be implemented according to other and different embodiments.

The present invention can be understood with a good technical and scientific knowledge of the evaporation, ebullition, the Marangoni effect, menisci and capillarity, friction and adhesion between liquids and solids, and, of course, of physics, fluid dynamics, thermodynamics and basic chemistry; such knowledge is assumed to be known in the detailed description which follows.

FIG. 1 shows a container 101 that contains a mass of liquid 102 in which substances (not visible in the figure) are present; the container has a cylindrical symmetry, and, in particular, looks like a pot with a lid. There are heating means 103, adapted to heat the liquid 102; in this figure, the heating means 103 are adjacent to the bottom (in particular this is a flat bottom) of the container 101, are centrally positioned and can be constituted, for example, by an electrical resistor; the heating means 103 heat the bottom of the container 101 and, by conduction, the liquid mass 102; as is known, this heating causes evaporation of the liquid 102 and, if the temperature rises sufficiently, boiling of the liquid 102. The upper part of the container 101 is dome-shaped and has an opening 105 from which the generator steam can escape due to the heating. There are two ducts 104A and 104B (in particular, one to the right and one to the left of the heating means 103) adapted to introduce liquid into the container 101, for example to fill it at the start of a process and to replace the evaporated liquid in whole or in part during the process; the number of ducts, the position and orientation thereof could differ with respect to this figure, for example, there just one central vertical duct could be provided in the middle of the heating means 103, but it is advantageous that they be arranged symmetrically in the event of there being more than one. This figure shows a concave meniscus (the dimensions thereof have been deliberately exaggerated in this figure), which has formed internally, at a certain height, at all the side wall of the container 101 (which is thus its perimeter wall); in a central zone 106 (which is, in particular, a circle), the free surface of the liquid 102 (which is located in the upper part) is perfectly flat; in a peripheral zone 107 (which is, in particular, a circular crown) the free surface of the liquid 102 (which is located in the upper part and which includes the meniscus) is curved upwards—this peripheral zone could be deemed, for example, a few millimeters wide; a thin layer of liquid in the central zone 106, below the upper free surface, can be deemed free of other substances and this is schematically represented by the horizontal dotted line in this figure. This figure schematically shows the flow of matter in the liquid phase from the lower central zone of the container 101 to the upper peripheral zone (where the meniscus is) of the container 101, as well as the flow of matter in the gaseous phase from the upper free surface of the liquid 102 to the opening 105; as will be better explained below, there is greater evaporation from the free surface in the peripheral zone 107, i.e. from the meniscus, with respect to the central region 106.

The equipment shown in FIG. 1 can be used to provide methods for controlling substances present in a liquid according to the present invention.

According to the present invention, the liquid mass (in which other substances are present) is brought to temperature and pressure conditions such as to give rise to an appreciable evaporation of the liquid and at least one solid surface is arranged, in part inside said liquid mass and in part outside said liquid mass so as to establish one (or more) appreciable meniscus of the liquid on this solid surface; in the particular case of FIG. 1, the solid surface is constituted by the inner surface of the side wall of the container 101, which is vertical, but which could also be oblique.

Appropriate stratagems can be used to ensure that the steam that comes out of the opening 105 is particularly "rich" or particularly "poor" in one of or in some or of or in all the substances present in the liquid. Consequently, the liquid will become "impoverished" or "enriched" in these substances; obviously, the any addition of further liquid into the container changes the situation.

For the purposes of the present invention, "appreciable evaporation" means, for example, that 5-25%, preferably 10-20%, of the liquid mass contained in the treatment container evaporates in one hour; alternatively, for example, we can refer to the temperature (the average temperature, for example) of the liquid mass and ensure that this is higher than the boiling temperature of the liquid reduced by 60° C., preferably ensure that this is higher than the boiling temperature of the liquid reduced by 40° C., more preferably ensue that this is higher than the boiling temperature of the liquid reduced by 20° C.

Figure 2:
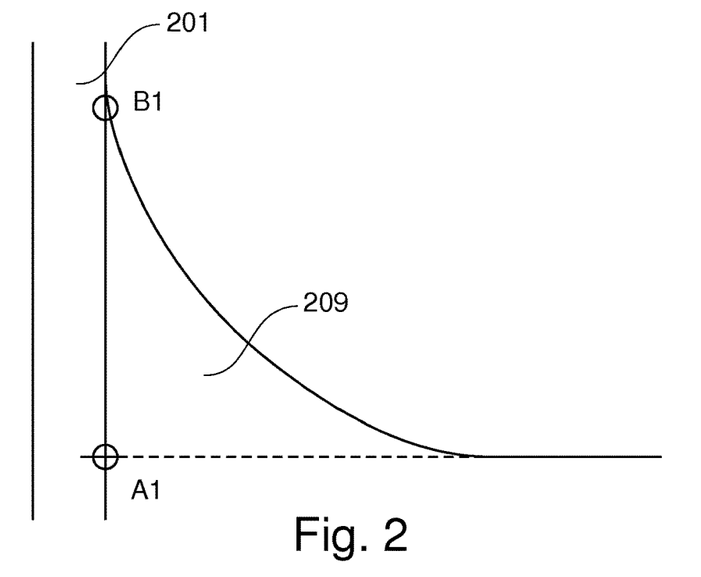
FIG. 2 shows a meniscus adjacent to a wall of a container.
Figure 3:
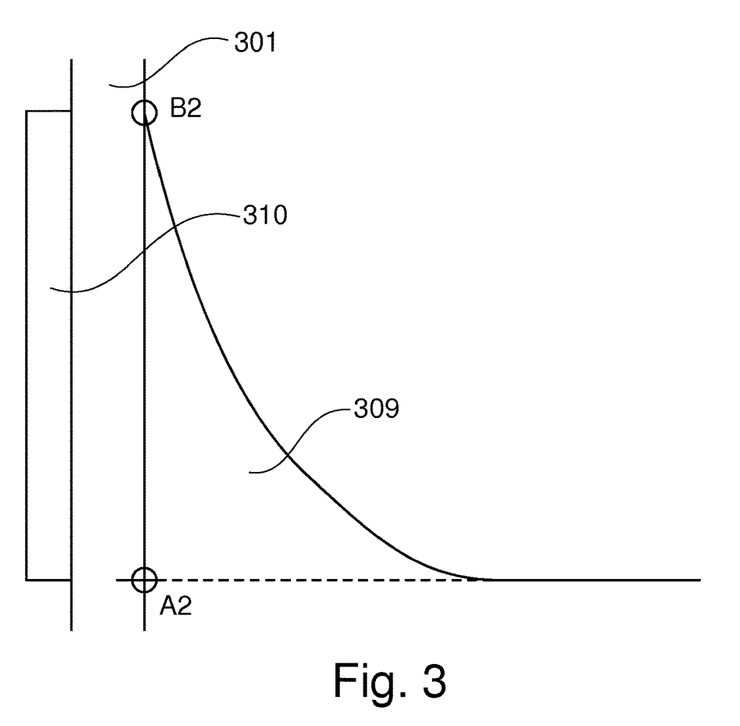
FIG. 3 shows a cooled meniscus adjacent to a wall of a container.

For the purposes of the present invention, "appreciable meniscus" means, for example, that the liquid rises, close to the solid surface, by least 2 mm, preferably by at least 4 mm, more preferably by at least 6 mm—in FIG. 2 the rise corresponds to the difference between the height B1 and the height A1 and in FIG. 3 the rise corresponds to the difference between the height B2 and the height A2.

One of the fundamental elements (probably the most important) of the method for controlling the substances is the controlling of the shape and/or of the size and/or of the extension and/or of the position and/or of the temperature of the meniscus (or of the menisci, in the event of there being more than one) so as to control the evaporation of the liquid through the meniscus; the meniscus can be concave or convex and more or less arched; the meniscus can be more or less high; the meniscus can be more or less long; the meniscus can be stable or movable, and variously arranged in relation to the parts of the treatment equipment; the meniscus can be more or less hot; it is of course understood that there are many implementation possibilities.

This element derives from the observation of the inventor, in the case of a concave meniscus, that there is a strong evaporation in the zone of the meniscus, that the evaporation causes an entrainment of the substances present where evaporation takes place, that there is a greater concentration of the substances present in the liquid in the meniscus zone, that a substance present in a liquid tends to deposit on a solid surface and the deposition is dependant on various parameters, including the concentration of the substance, the type of liquid, the type of substance, the type of material of the solid surface (of course, the temperature also influences the deposition). In the case of a convex meniscus, the situation changes.

"Control of shape, size, extension, position, temperature of the meniscus" as used herein means the activities that aim to reduce or maintain constant or increase these magnitudes, according to the well-known and broad meaning that is given to the word "control" in the "engineering" field; therefore "control of . . . " as used herein means neither simply the verification nor simply the measurement of these magnitudes.

Another important observation of the inventor is that the evaporation (per unit area) from the free (curve)surface where there is a (concave) meniscus is is very high and it is appropriate that it be compared with the evaporation (per unit area) from the free (flat) surface where there is no meniscus, and that at the free, flat surface of the liquid (thin upper layer) the liquid is very pure. There are therefore at least two evaporations having a somewhat different content to consider; in effect, there is also a third evaporation which is very different from these two as it is abrupt and intermittent i.e. the evaporation deriving from the formation of bubbles of steam within the liquid mass and from their ascent towards the free surface of the liquid.

It is worth mentioning that, on the basis of recent studies, a region of (concave) meniscus is divided into three sub-regions: a lower sub-region of intrinsic meniscus, above this a sub-region having a thin evaporating film and, above this still, a sub-region having a thin film adsorbed by the solid, non-evaporating surface; when representing the meniscus the uppermost sub-region is usually disregarded.

As mentioned, among the various possible controls there is the control of the deposition of the substances present in the liquid onto a solid surface at the meniscus; this can be more effectively accomplished for one (or more) of the substances if it is present in solid state in the form of very small, small or medium sized particles (large heavy solid particles tend to naturally precipitate); since the liquid and the substances are generally the very subject of the treatment process, this control takes place by choice of the material of the solid surface and of its surface properties (which can also depend on how it the surface is produced), in particular its ability to firmly retain one (or more) of the substances present in the liquid giving rise to "adhering deposits"—for example a process according to the present invention could aim only to control a very specific substance or family of substances.

It is possible for the solid surface used to create the meniscus to correspond to the inner surface of the perimeter wall of a container containing the liquid, as in the case of the equipment of FIG. 1. However, there can be a need to create multiple menisci and/or to create menisci that extend beyond the perimeter of the container and/or that the material that is to be used for the solid surface is not suitable for producing a container; in these cases, for example, the solid surface or the solid surfaces are distinct from the surfaces of the walls of the container at least at the free surface of the liquid.

Figure 4:
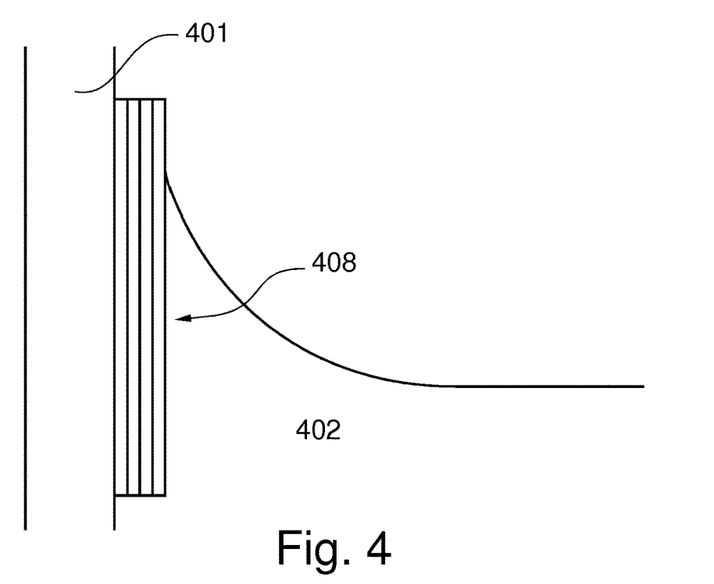
FIG. 4 shows a concave meniscus of a liquid adjacent to a solid layered surface that is in turn adjacent to a perimeter wall of a container.
Figure 5:
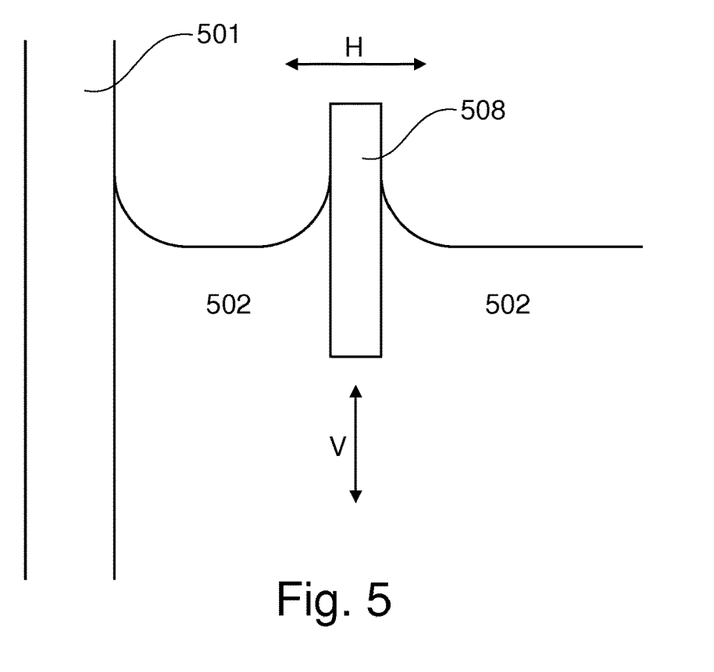
FIG. 5 shows three concave menisci formed by one side of a perimeter wall of a container and by both sides of a solid movable surface.

The solid surface can be movable as shown in FIG. 4 and FIG. 5 (in both figures the menisci have deliberately exaggerated dimensions); in FIG. 4, the solid surface 408 has layers that can be removed, in particular entrained upwards; in FIG. 5, the solid surface 508 can move both vertically (arrow V), repeatedly up and down in particular, and horizontally (arrow H), repeatedly to the left and right in particular near the perimeter wall of the container 501.

The solid surface can be repeatedly inserted into and extracted from the liquid. This can be obtained, for example, by means of a rotary movement: if the solid surface is a circle arranged with axis parallel to the surface of the liquid there is a continuous exchange of the surface in contact with the liquid when the circle rotates.

The solid movable surface can be heated to influence the deposition of material.

The solid movable surface can be cleaned (of deposits of substance/s) before being reinserted into the liquid.

The solid surface can be repeatedly moved closer to and away from the perimeter wall of a container containing the liquid, as shown by the arrow H in FIG. 5 in relation to the surface 508 and to the perimeter wall of the container 501; thus, the menisci bend more and wet the upper parts of the surface and of the wall. Also in this case, the solid surface and/or the perimeter wall can be heated to influence the deposition of the material. Also in this case, the solid surface and/or the perimeter wall can be cleaned repeatedly.

The solid surface used to create the meniscus or the menisci can be removable; for example, it can be removed when the deposits of the substance/s exceed a certain level or thickness; this removal can be total or partial, for example, of just an outer layer of the solid surface (i.e. the one in contact with the liquid, in particular with the zone of the meniscus). FIG. 4 shows a solid surface 408 adjacent to the perimeter wall of the container 401 constituted by a plurality of thin layers that are adjacent to each other and that can slide between them; thus, when the deposits of the substance/s exceed a certain level or thickness, the outermost layer (i.e. the one in contact with the liquid, in particular with the zone of the meniscus) can be removed, in particular entrained upwards, and a new layer remains in contact with the liquid 402.

As previously mentioned, it is possible to arrange a plurality of solid surfaces, in part inside the liquid mass and in part outside the liquid mass, so that a plurality of menisci of the liquid are established on the solid surfaces; it is worth clarifying that these solid surface are typically, but not necessarily, rigid; it is worth bearing in mind that menisci behaviour differs depending on whether they are concave or convex and that the configuration of the meniscus is depends on the liquid and on the material of the solid surface in the interface zone between liquid and gas.

Cleaning of the solid surface (if needed or useful or, in any case desired) can be carried out in various ways.

The solid surface can be cleaned of substances deposited thereon by means of sliding; this sliding can be obtained by means of one or more members adjacent to the solid surface and moved by means of movement means (using magnetic forces in particular); this sliding can be obtained by means of floating and freely movable members on the free surface of the liquid.

Alternatively, for example, the solid surface can be cleaned by substances deposited thereon by ultrasound.

The phenomena which occur in the meniscus region are influenced by the temperature of the solid surface used to create the meniscus; therefore, depending on the use of the control method, it can be useful to heat or cool this meniscus region; the most direct method of influencing this temperature is the method of controlling the temperature of the solid surface—reference can be made to FIG. 2, which shows in detail a meniscus 209 adjacent to a portion of the side wall of the container 201. This control is particularly important when the solid surface corresponds to a wall of the container; indeed, if the container is heated to obtain the evaporation of the liquid (as in FIG. 1), part of this heat is transmitted to the meniscus region by conduction.

In FIG. 2, there is no particular stratagem for controlling the temperature of the wall of the container 201, and the meniscus 209 takes on a certain shape and a certain extension, i.e. it begins at the height A1 (considering the level of the liquid in the container) and ends (substantially) at the height B1.

In FIG. 3, on the outer side of the wall of the container 301, are positioned means 310 which cool the wall itself and thus the adjacent meniscus 309; it is observed that the meniscus 309 takes on a different shape and a different extension, i.e. it begins at the height A2 (considering the level of the liquid in the container) and ends (substantially) at the height B2 greater than the height B; the solid surface is thus kept wetter and thus reducing the likelihood of the solid particles deposited therein from detaching therefrom and being entrained by the steam; in addition, if the meniscus is cold, evaporation is reduced and the likelihood of bubbles of steam forming therein is further reduced. It is worth clarifying that in FIG. 3, the means 310 are perfectly aligned with the heights A2 and B2, but this is not indispensable; on the contrary, they should extend a little below the height A2 and a little above the height B2; in addition, the means 310 should take into account the level of liquid in the container, should this not be constant during the treatment period.

As an alternative to the solution shown in FIG. 3, there are many ways of influencing the temperature of the wall of the container at the meniscus; for example, even a simple thinning thereof has effect. The various possible solutions can be divided into two categories: the active solutions, which are associated with or integrated in the wall and which introduce or remove heat in a zone horizontally aligned with the meniscus or in a zone that is a little lower and/or a little higher, and the passive solutions, which are associated with or integrated in the wall and which promote or hinder the flow of heat along the wall. It should be noted that the temperature of the wall of the container is also influenced by the introduction of heat due to the convective motions of the liquid towards the zone of the meniscus and to the absorption of heat due to evaporation in the zone of the meniscus.

It is also possible to perform a very accurate temperature control that varies from point to point of the wall.

Control of the substances present in the liquid can also be obtained by controlling the level of the liquid in the container; indeed, so long as they remain wet and stable, any deposits on the solid surface/s do not greatly contribute to the entrainment by the nascent steam. Therefore, is very advantageous to maintain constant the level of the liquid in the container to limit the detachment of small or very small solid particles from solid surfaces; it is also possible to increase perhaps slowly, the level of liquid in the container until the container is full. For these applications it is advantageous (even if not strictly necessary) to record the level of the liquid by measuring the pressure at the bottom of the container; thus, the recording is continuous and accurate. Since the liquid evaporates due to temperature and to prevent the level of the liquid from decreasing (for the reason described above), the introduction of liquid into the container can be envisaged; preferably, this introduction occurs slowly at the bottom of the container so as not to disturb the surface regions of the liquid (with turbulence or vortices caused by the inflow), either at the centre or on the perimeter of the container, in particular not where there are menisci.

As previously mentioned, the liquid must be heated to cause the evaporation thereof.

A first possibility is to bring the liquid to its boiling temperature; the evaporation is thus very strong; however, it should be ensured that the bubbles of steam are not too large i.e. that the boiling is not violent.

So as to prevent (or in any case greatly limit) the bubbles of steam, the liquid can be heated to below the boiling temperature, for example to a temperature ranging between 70% and 99% of the boiling temperature thereof (expressed in degrees Celsius), or, more advantageously, to a temperature between 80% and 90% of the boiling temperature thereof (expressed in degrees Celsius).

In making these observations on the temperature of the liquid, it should be borne in mind that the heat source is concentrated (as in the case of FIG. 1), the liquid near the heat source can be considerably hot and thus give rise to bubbles of steam even if the liquid is, on average, at a lower temperature (even just slightly) that the boiling temperature thereof.

Precisely for this reason (any bubbles of steam), it is advantageous for the heat source to be in the central region so that the convective motions of hot liquid with any bubbles of steam do not rise at the perimeter walls of the container (or of the solid surfaces adapted to create menisci) and do not reach the meniscus or menisci and are not at risk of detaching particles of solid substances from the deposits on the perimeter walls of the container (or on solid surfaces adapted to create menisci); it must be taken into account that these deposits can be more or less adherent (this depends, in particular, on the material and on the properties of the wall) and more or less compact (this depends, in particular, on the substance that forms the deposit). For this same reason (any bubbles of steam), it is advantageous for the perimeter walls (vertical or oblique) of the container are cooled in order to prevent the risk of the walls themselves being a source of convective motions and of bubbles of steam.

In relation to the bubbles of steam, it is worth considering that in the formation step of a bubble of steam, any substances present in the liquid in the formation zone tend to be incorporated into the bubble and entrained upwards by the bubble itself; however, the incorporated substances tend to get lost along the upward path of the bubble and, if the path is sufficiently long, the bubble reaches the free surface of the liquid more or less free of other substances. These considerations do not apply in general if the bubbles of steam form along the walls of the container or at the bottom of the walls of the container due to the possible interactions between the bubbles and the inner surface of the walls.

In addition to or alternatively to controlling the meniscus or menisci, the present invention can provide for controlling of the flow due to evaporation of the liquid through said meniscus; according to the observations of the inventor, this flow is typically rich in substances other than the liquid itself.

This flow of steam can be condensed and returned into the liquid itself. In FIG. 7 for example, the wall of the container 701 internally has, at the concave meniscus of the liquid 702, above the same, a flange 711 (preferably) bent downwards; above the flange there can advantageously be cooling means 712, adapted to cool the flange 711 (they also indirectly cool the wall of the container 701, both downwards and upwards); when the steam rises upwards from the meniscus, it is retained by the flange 711, which is cold and condenses returning it towards the liquid below.

Alternatively, the flow of steam can be removed from the container. For example in FIG. 7, there is an opening 713 just below the flange 711 which can be connected to a removal duct; following removal, the steam can be condensed (by cooling for example) away from the container 701.

It should be noted that in the solution of FIG. 7, the steam will be in part condensed and in part removed from the container 701.

As is evident to a person skilled in the art, the shape and the size of the flange can differ from the one shown in FIG. 7; the flange protrudes towards the inside of the container preferably by at least 5 mm, more preferably by at least 10 mm, more preferably still by at least 15 mm.

As is evident to a person skilled in the art, the cooling means, if present, could be associated with a flange of extremely small, even null size; in particular, the shape and the upper extension of the container 701 could act as a flange; the function of the cooling means is to promote condensation of the steam originating from the meniscus.

A flange equal to or similar to the member 711 can be defined as a "skirt", and in particular a "cooled skirt". This skirt is located near the meniscus, i.e. near the solid surface that generates it. There could be multiple skirts, one for each meniscus. The skirt could also be movable and thus follow the movements (raising or lowering) of the level of liquid in the container.

The steam originating from the meniscus can be kept separate, by means of the skirt, from the steam originating from the flat surface of the liquid and from the steam originating from the rising bubbles of steam; discrimination can therefore take place on the basis of the steam content of these three sources.

In addition to, or as an alternative to controlling the meniscus or the menisci, the present invention can provide for a thin layer of liquid (which, according to the observations of the inventor, is extremely pure and free of substances) to be removed form the free (upper) surface of the liquid, excluding the free surface of the meniscus.

This removal can be obtained, for example, by heating the liquid so as to give rise to an appreciable evaporation by radiant heating means, and by placing these heating means so as to irradiate the free (upper) surface of the liquid and not to irradiate the meniscus or menisci.

Alternatively, this removal can be performed, for example, by mechanical means, in particular by maintaining the level of the liquid slightly higher at the edge of the perimeter wall of the container containing the liquid itself.

In addition to, or as an alternative to the control of the meniscus or of the menisci, the present invention can provide for the solid surface used to create the meniscus or menisci to be wet, in particular maintained wet, above the meniscus; thus, the likelihood of the solid particles deposited thereon detaching therefrom and being entrained by the steam is reduced.

Figure 6:
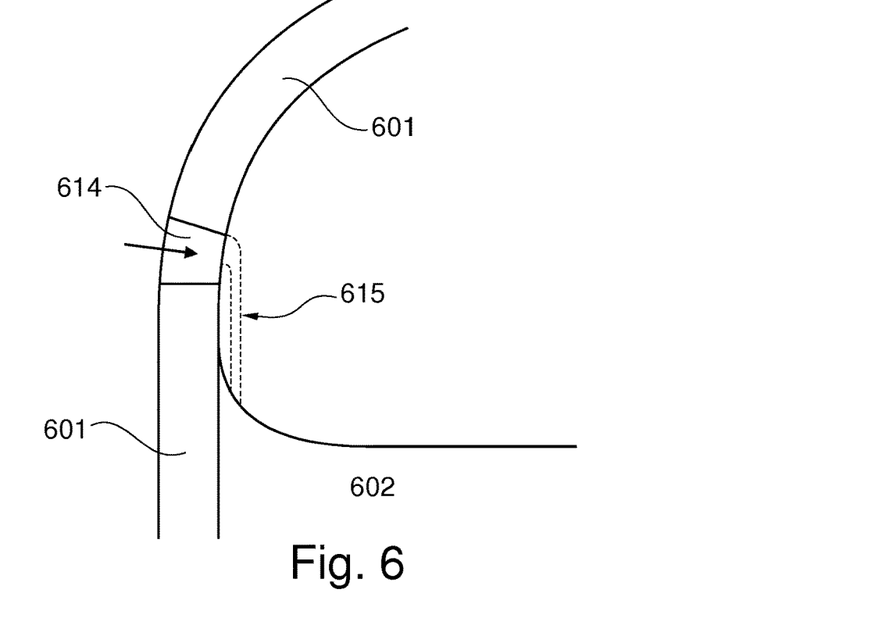
FIG. 6 shows a meniscus adjacent to a wall of a container which is kept wet forcibly.

In FIG. 6, the wet surface is the perimeter wall of the container 601 containing the liquid 602. In particular, a downward flow 615 of liquid on the solid surface is provided; it escapes from an opening 614; of course, the openings are a plurality of openings arranged along the length of the solid surface.

Alternatively, a spray of liquid onto the solid surface can be provided.

The previously described and illustrated solutions can be combined together.

The liquid containing substances can be treated at least in a first step and in a second step that is successive to the first step; in the first step one or more of said substances agglomerate at least in part; in the second step, the liquid with at least partially agglomerated substances is evaporated. One or more of the previously described and illustrated solutions can be used in the second step. The agglomerated substances are thus much less likely to be entrained in the flow of steam; indeed, if the agglomeration were considerable the particles would remain on the bottom of the container.

The present invention is particularly effective in the case of solid substances.

It should be noted that liquid substances can behave in a manner that is entirely analogous to solid substances. Indeed, a liquid substance in a liquid can give rise to an "emulsion", i.e. an heterogeneous dispersion, or to a "colloidal solution", i.e. a "microheterogeneous" dispersion; in these cases, the drops of liquid are analogous to the particles of solid. In addition, the fact that a substance is in the solid state or in the liquid state depends on the melting temperature thereof and on the temperature of the liquid in which it is dispersed; quite frequently the boiling temperature of the liquid is below the melting temperature of the substance dispersed therein, however the present invention can be useful even when this condition is not met.

Moreover, in the case of liquid substances in homogeneous solution, the phenomena of the high concentration of substances in the regions of the menisci and of the different evaporation between regions with curved free (upper) surface of the liquid (where the menisci are) and regions with flat free (upper) surface of the liquid (where there are no menisci).

The present invention does not apply to gaseous substances that may be present in the liquid.

As mentioned, the methods for controlling the substances present in a liquid as previously described and illustrated have various applications, but fundamentally two applications:

the separation of substances,
the reaction of substances.

In general, the separation method of at least one substance present in a liquid, provides for:
the establishing of at least one meniscus of the liquid, and
controlling of the evaporation of liquid through the free surface of the meniscus;
whereby a controlled flow of the substance is produced through the free surface of the meniscus.

In addition, the deposition of the substance can be controlled on at least one solid surface, in part inside the liquid and in in part outside liquid at the meniscus, whereby a controlled flow of the substance is produced through the free surface of the meniscus.

It is worth highlighting at this point that, depending on how the present invention is implemented and used, the separation of the substance from the liquid can take place by generating a liquid with reduced content of the substance or a steam with reduced content of the substance; in other words, the entrainment of the substance on the part of the steam can be promoted or the entrainment of the substance on the part of the steam can be hindered.

It is, in particular, a solid substance, i.e. in the form of very small or small or medium sized solid particles.

In general, the method for promoting reactions (in particular chemical reactions) between at least two substances present in a liquid, provides for:
the establishment of at least one meniscus of the liquid, and
controlling of the evaporation of liquid through the free surface of the meniscus; whereby a controlled flow of the two substances is produced towards the volume of the meniscus.

There is thus an increase in the concentration of reagents in a small space (i.e. the volume defined by the meniscus) and there is therefore an increased likelihood of them reacting.

In addition, the deposition of the two substances on at least one solid surface, in part inside the liquid and in part outside the liquid, at the meniscus can be controlled, whereby a controlled flow of the two substances towards the solid surface is produced.

This is in particular two solid substances, namely in the form of very small or small or medium sized solid particles.

It is worth pointing out that, using the technical teachings described herein, by controlling the evaporation of the liquid it is also possible to control the substances present in the steam and deriving from the substances present in the liquid. One practical application of this is the control of odours emanated from a container containing a high temperature liquid (at boiling temperature for example); this is the case of pots for cooking food. In fact, the odoriferous sensations are caused by any odorant substances dissolved into the gas that reaches the receptors of the olfactory system.

For completeness, it is worth clarifying that many of the technical teachings described herein can also be used in the case in which the dispersing phase is plasma instead of liquid.

The previously described methods and equipments have clear industrial application.

For example, with reference to equipment such as the one shown in FIG. 1 with the addition of the device shown in FIG. 7 (and claimed herein), when the liquid 102 contained in the container 101 is heated, the steam that escapes from the upper opening 105 is almost devoid of the additional substances present in the liquid itself. Indeed, it originates from evaporation of the central zone of the free surface of the liquid 102 from which much liquid (in the form of steam) and few additional substances rise; while the steam originating from the peripheral zone 107, where the meniscus is, and from which appreciable quantities of additional substances also rise is intercepted by the flange 711 and recondensed through the means 712 or expelled through the openings 713. Separation of the liquid from the additional substances and a flow that escapes from the upper part of the container, which is pure, is thus obtained.

The invention claimed is:
1. A system for separating at least one substance present in a liquid, comprising:
a container arranged to internally contain a mass of said liquid, wherein there is present an amount of said at least one substance, and
a heater arranged to heat said mass of said liquid at a temperature such as to give rise to evaporation of said liquid;

wherein, said container comprises an upper part that is dome-shaped and has an opening from which vapor generated due to the heating of said mass of said liquid can escape, and wherein said container comprises a perimeter wall that is internally arranged vertically or obliquely and wherein said liquid forms a concave meniscus in said container;

wherein said perimeter wall of said container has an internal flange at said meniscus, above said meniscus, that protrudes towards the inside of the container and is arranged so that vapor rising upwards from the meniscus is retained by said internal flange, whereby vapor originating from said meniscus can be kept separate from vapor originating from a flat liquid surface and from vapor originating from rising vapor bubbles.

2. The system according to claim 1, wherein said heater is arranged adjacent to a bottom portion of said container to heat said mass of said liquid at a temperature above the boiling temperature of said liquid reduced by 20-60° C.

3. The system according to claim 1, wherein said heater is arranged adjacent to a bottom portion of said container to cause an evaporation of 5-25% of said mass of said liquid in one hour.

4. The system according to claim 1, wherein said perimeter wall of said container is internally arranged vertically or obliquely to establish a concave meniscus of said liquid being raised by at least 2 mm.

5. The system according to claim 1, wherein said internal flange is bent downward.

6. The system according to claim 1, wherein said internal flange protrudes towards an internal portion of said container by at least 5 mm.

\* \* \* \* \*